United States Patent [19]

Hazumi et al.

[11] 4,117,389
[45] Sep. 26, 1978

[54] LOW FREQUENCY HIGH OUTPUT ALTERNATING CURRENT GENERATING DEVICE

[75] Inventors: Kenji Hazumi, Tokyo; Katsutoshi Tagami, Asaka, both of Japan

[73] Assignees: Sawafuji Electric Co. Ltd.; Honda Giken Kogyo Kabushiki Kaisha, both of Tokyo, Japan

[21] Appl. No.: 690,857

[22] Filed: May 28, 1976

[30] Foreign Application Priority Data

Jun. 10, 1975 [JP] Japan .................................. 50/70040

[51] Int. Cl.² ...................... H02M 5/297; H02P 9/14
[52] U.S. Cl. .................................... 322/47; 322/32; 363/161; 322/28
[58] Field of Search ................ 322/32, 47, 28; 321/4, 321/2, 61, 62, 63; 363/161, 174, 175; 310/160

[56] References Cited

U.S. PATENT DOCUMENTS

| | | | |
|---|---|---|---|
| 2,451,954 | 10/1948 | Johns | 322/47 |
| 2,769,106 | 10/1956 | Dembowski | 322/47 X |
| 3,089,992 | 5/1963 | Seney | 321/4 X |
| 3,173,076 | 3/1965 | Adkins | 322/47 |
| 3,204,173 | 8/1965 | Jackson | 322/28 |
| 3,287,622 | 11/1966 | Eckenfelder et al. | 363/161 |
| 3,832,625 | 8/1974 | Gyugi | 322/47 |

*Primary Examiner* — Robert J. Hickey

[57] ABSTRACT

A low frequency, high output alternating current generating device comprising a high frequency generator having an output winding capable of generating a continuous wave high frequency output with an almost constant amplitude, a rectifying means for rectifying the high frequency output of the output winding, a plurality of condition control means for connecting the output of the rectifying means to a load by time-selectively and alternately reversing the polarity of the output, and a reference signal generating means for applying low frequency control signals to each of the conduction control means regardless of the phase of the high frequency output.

6 Claims, 18 Drawing Figures

FIG. IA
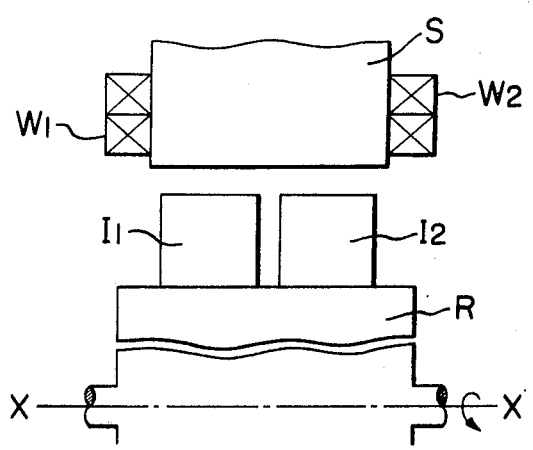
FIG. IB
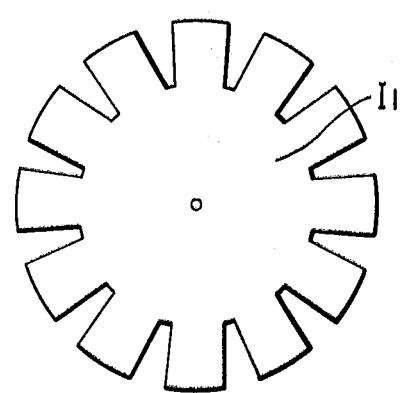
FIG. IC
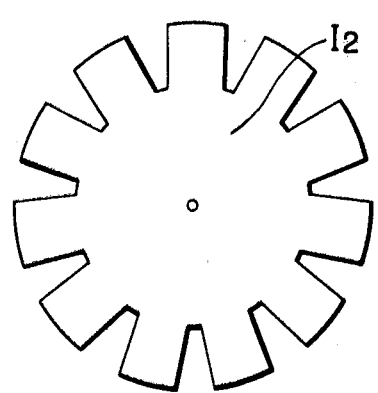

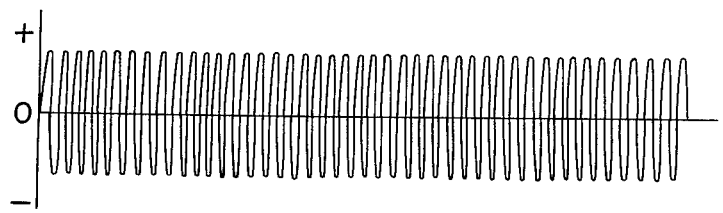
FIG. 5A
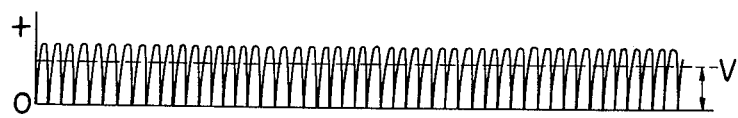
FIG. 5B
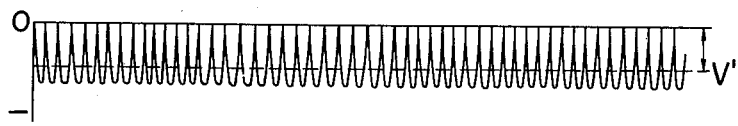
FIG. 5B'
FIG. 5C
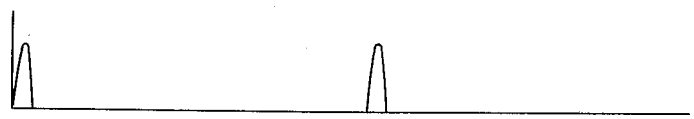
FIG. 5D
FIG. 5E
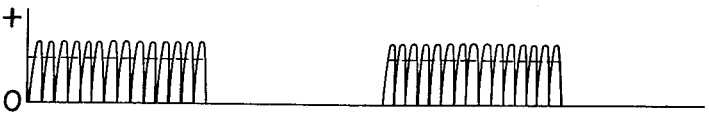
FIG. 5E'
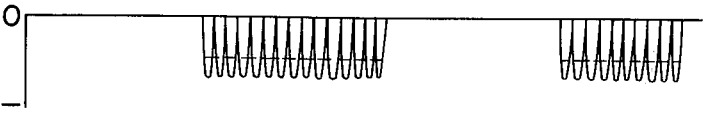
FIG. 5F
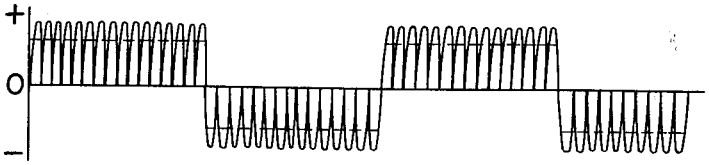

LOW FREQUENCY HIGH OUTPUT ALTERNATING CURRENT GENERATING DEVICE

BACKGROUND OF THE INVENTION

1. Field of the Invention

This invention relates generally to an alternating current generating device, and more particularly to an alternating current generating device for producing a low frequency output of, for example, 50 Hz, 60 Hz, etc., wherein an inductor-type high frequency generator is used and a high frequency output thereof is rectified and combined after polarity reversion to obtain a high power low frequency output.

2. Description of the Prior Art

When an ordinary AC generator is used to obtain a low frequency output of, for example, 50 Hz, the number of revolution N of the AC generator is generally expressed by the following equation.

$$N = 120f/P \qquad (1)$$

where $f$ is a frequency and $P$ is the number of magnetic poles. In this equation, the number of revolution $N$ is limited to 3,000 rpm even when the number of magnetic poles $P$ is set at the minimum of two poles. For this reason, in designing, for example, a small-sized engine generator, there has been a limitation which makes it impossible to increase the number of revolution to obtain high output.

To overcome this, a technique has been developed in which two inductors whose number of teeth (poles) is slightly different from each other are used in an inductor-type generator to produce a high frequency output containing beats corresponding to the difference in the number of teeth, the positive and negative polarity portions of the envelope waveform (beat frequency waveform) of the high frequency output are separately rectified and extracted, and then superposed to obtain a low frequency output of a beat frequency of, for example, 50 Hz. In obtaining a low frequency output of, for example, 50 Hz, suppose the number of teeth in the two inductors are P1 = 12 and P2 = 11, respectively, and the frequencies of the high frequency outputs in each inductor to produce beats are $f_1 = 600$ Hz and $f_2 = 550$ Hz, respectively, then the number of revolution N can be set at N = 6,000 rpm, and accordingly a low frequency output of sufficient power can be obtained.

In the above-mentioned technique, however, not only two inductors having different numbers of teeth have to be provided in a high frequency generator, but the phase of the envelope waveform of the high frequency output is required to be accurately matched with the phase of the control signal for the means for separately rectifying and extracting the positive and negative polarity portions of the envelope. When the rectifying and extracting means is constructed by an SCR, for example, a circuit is required for synchronization controlling the oscillation circuit, which generates SCR trigger pulses, by means of the envelope of high frequency output of the generator. This inevitably makes the generating device of complicated construction and expensive in cost, and causes many troubles.

SUMMARY OF THE INVENTION

An object of this invention is to provide an AC generating device solving the above-mentioned problems.

Another object of this invention is to provide a low frequency and high output AC generating device, which is not of such a special construction as mentioned above.

A further object of this invention is to provide an AC generating device which does not require any circuit for synchronization controlling the rectifying and extracting means described above.

Still a further object of this invention is to provide an AC generating device whose external characteristics are improved by providing an output voltage stabilizing means.

An even further object of this invention is to provide an AC generating device in which a capacitor is connected across the output terminals to eliminate high frequency ripples from a low frequency output to be supplied to the load, and to reduce the circuit loss caused by high frequency in the conduction controlling means.

BRIEF DESCRIPTION OF THE DRAWINGS:

FIGS. 1 A, B and C are schematic diagrams illustrating an inductor type high frequency generator used for an AC generating device considered as a premise of this invention.

FIGS. 5 A, B, B', C, D, E. E', and F are diagrams illustrating operations of the embodiment shown in FIG. 4.

DETAILED DESCRIPTION OF PREFERRED EMBODIMENTS:

First, an AC generating device considered as a premise of this invention will be described.

Figure 2:
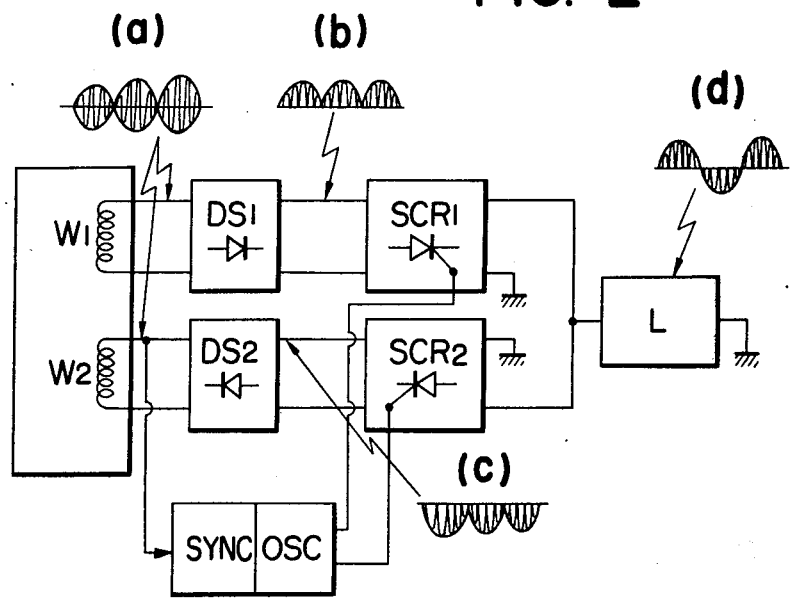
FIG. 2 is a diagram illustrating the whole construction of the AC generating device using the high frequency generator of FIG. 1.

FIG. 1A is a cross section including the revolving shaft X —X' of an inductor type high frequency generator. As shown in FIGS. 1 B and C, an inductor $I_1$ having 12 teeth and an inductor $I_2$ having 11 teeth are disposed on a rotor R, and output windings $W_1$ and $W_2$ serving as an output winding are wound on a stator S facing the rotor R. Suppose the number of revolution N of the rotor R is N = 6,000 rpm, the frequencies $f_1$ and $f_2$ of high frequency electromotive forces generated by the inductors $I_1$ and $I_2$ are $f_1 = 600$ Hz and $f_2 = 550$ Hz, respectively, as evident from the equation (1) above. Thus, high frequency outputs containing beats of 50 Hz are generated in output windings $W_1$ and $W_2$ as the result of synthesis of these high frequency electromotive forces. FIG. 2 is a block diagram roughly showing an AC generating device constructed so as to supply the load with this high frequency output (a) after converting into a desired low frequency output. In the figure, DS₁ and DS₂ are diode stacks for full wave rectification, SCR₁ and SCR₂ are silicon controlled rectifiers for controlling conduction by means of given low frequency controlling signals. OSC is a reference signal generating means for applying low frequency control signals to the silicon controlled rectifiers SCR₁ and SCR₂. SYNC is a synchronization circuit for controlling the phase of signals generated in the reference signal generating means OSC, and L is a load.

Now, the operation of the AC generating device shown in FIG. 2 will be described referring to waveforms shown in the figure. The high frequency outputs (a) induced in the output windings W₁ and W₂ of the inductor type high frequency generator of FIG. 1 is full-wave rectified in opposite polarities with each other in the diode stacks DS₁ and DS₂ to obtain rectified outputs (b) and (c). These rectified outputs (b) and (c) are alternately conducted by means of conduction control means including silicon controlled rectifiers SCR1 and SCR2, and the positive and negative polarity portions of the high frequency output (a) are alternately supplied to the load L every half cycle of the beat frequency. That is, control signals which are 180° apart in phase are applied from the reference signal generator OSC to the gates of the silicon controlled rectifiers SCR1 and SCR2. And, the phase of the above-mentioned control signals is controlled by the synchronization circuit SYNC to synchronize with the phase of the envelope waveform of the high frequency output (a) or the full-wave rectified output (b) or (c) so that the waveform (d) of the low frequency output fed to the load L precisely corresponds with the above-mentioned beat signals.

In an AC generating device using a high frequency generator containing beats as described above, a special high frequency generator having inductors I1 and I2 with different number of teeth shown in FIG. 1 has to be used, and it is necessary to precisely match the phase of the envelope wave form of the high frequency output (a) with the phase of the control signal which is fed to the conduction control means for alternately rectifying and extracting the positive and negative portions of the high frequency output. As a result, this type of generating device has to be of a complicate construction having a synchronization circuit SYNC, involving increased costs and frequent troubles.

Figure 3:
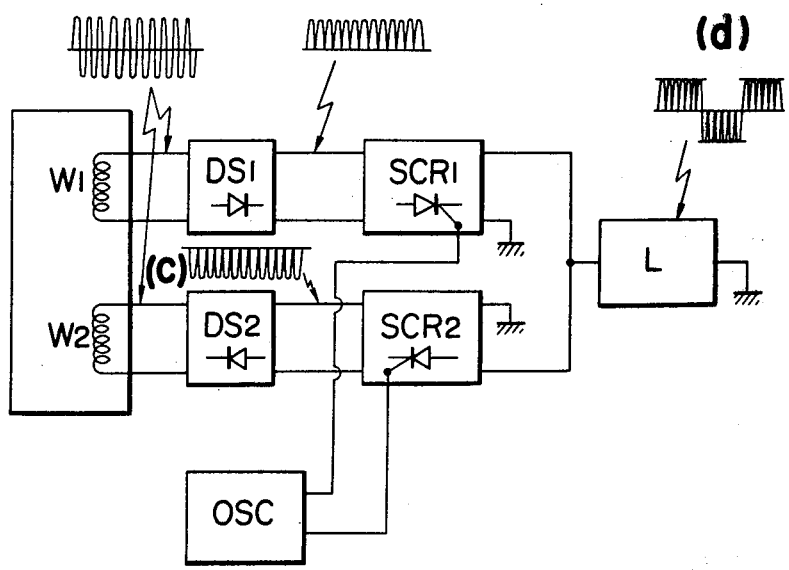
FIG. 3 is a diagram illustrating the whole construction of an AC generating device embodying this invention.

FIG. 3 is a block diagram roughly illustrating a preferred embodiment of an alternating current generating device of the present invention. In the figure, W1 and W2 are output windings provided in a high frequency generator having an ordinary inductor, and DS1 and DS2 are rectifying means, or diode stacks for full-wave rectifying a high frequency output produced in the output winding W. SCR1 and SCR2 are silicon conduction controlling means, or controlled rectifiers for controlling conduction at a desired frequency, OSC is a reference signal generating means for applying a low frequency controlling signal to silicon controlled rectifiers SCR1 and SCR2, and L is a load.

Now, the operation of the AC generating device shown in FIG. 3 will be described referring to the waveform diagram in the figure. In the case of this embodiment, two output windings W1 and W2 are used, in which high frequency outputs (a) of an almost constant amplitude are generated by a single inductor. The high frequency outputs (a) are full-wave rectified by the diode stacks DS1 and DS2 in opposite polarities with each other to obtain full-wave rectified outputs (b) and (c) of an almost constant amplitude. Then, the rectified outputs (b) and (c) are switched over alternately at a predetermined frequency by the silicon controlled rectifiers SCR1 and SCR2 to supply the load L with a low frequency output (d) shown in the figure. The control signal with a phase 180° apart applied to the silicon controlled rectifiers SCR1 and SCR2 by the reference signal generating means OSC can alternately switch over and extract the positive and negative polarity portions of the high frequency outputs (a) in any phase since the high frequency outputs (a) has an almost constant amplitude. Consequently, no synchronization control is required between the controlling signal and the high frequency output, and the waveform of the low frequency output (d) supplied to the load L assumes a predetermined rectangular waveform whose phase is determined by the oscillated phase in the reference signal generating means OSC.

Figure 4:
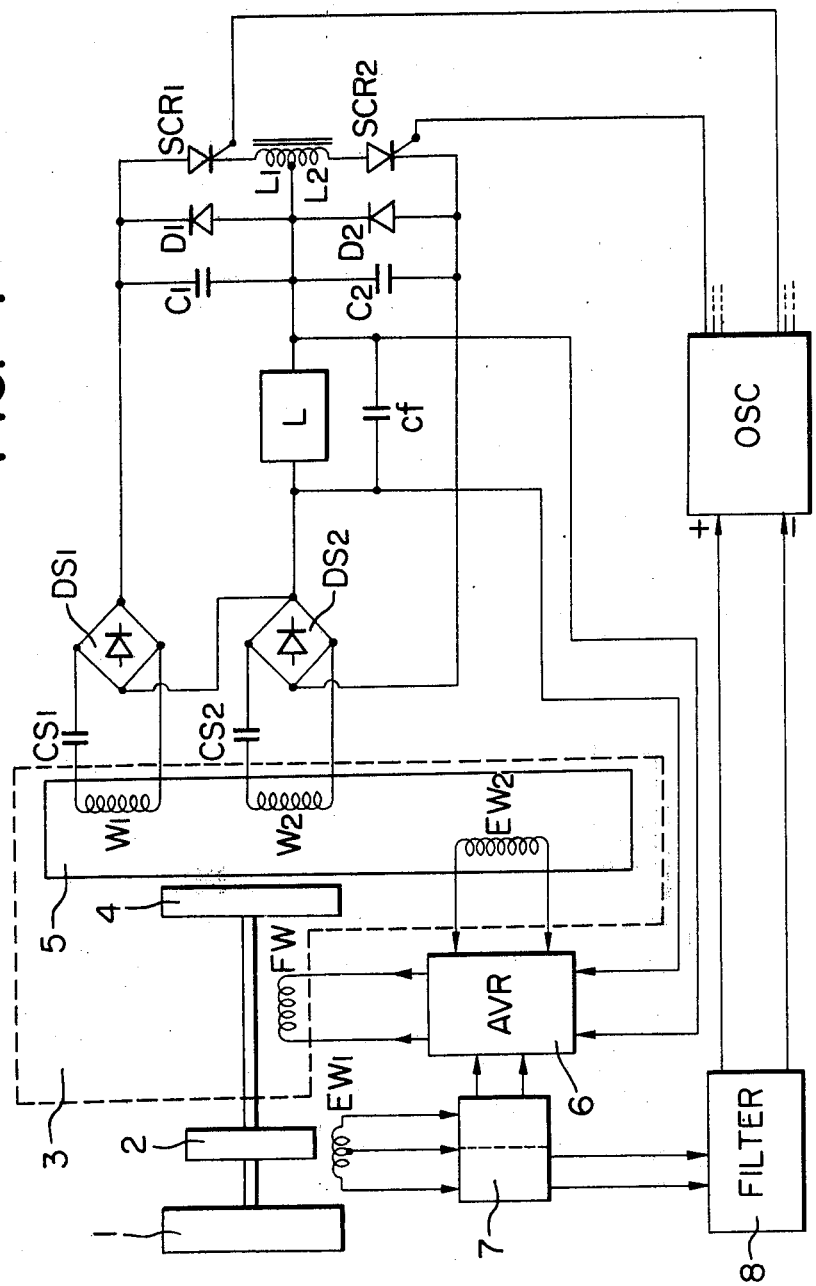
FIG. 4 shows a construction of a concrete embodiment of this invention.

FIG. 4 is a schematic diagram of an AC generating device embodying this invention described in relation to FIG. 3. In the figure, numeral 1 refers to an engine, 2 to an engine flywheel, 3 to a high frequency generator having an inductor 4 and a stator 5 on which coils are wound. Numeral 6 refers to an output voltage stabilizing means (AVR) for supplying a field coil FW with an exciting current by controlling an output from an exciter coil EW2 wound on the stator 5. Numeral 7 refers to a rectifying circuit for rectifying electromotive force generated in an exciter coil EW1 provided on an engine flywheel, 8 to a filter, W1 and W2 are output windings, CS1 and CS2 are series capacitors for nullifying inductive reactance of output windings, DS1 and DS2 to rectifying means, or diode stacks for full-wave rectifying a high frequency output produced in output windings, SCR1 and SCR2 to silicon controlled rectifiers, or conduction controlling means, C1, C2, D1, D2 and L1, L2 are capacitors, diodes and transformer windings, constituting a commutation circuit of silicon controlled rectifiers SCR1 and SCR2. L refers to a load, Cf to a filter capacitor, OSC to a reference signal generating means.

Now, the operation of the AC generating device of FIG. 4 will be described referring to FIG. 5. The high frequency generator 3 has an inductor 4 mounted on a rotor. The inductor 4 is rotated by the engine 1 to induce electromotive force as shown in FIG. 5A in the output windings W1 and W2 mounted on the stator 5. High frequency outputs of a frequency $f$ determined by the following relation are produced in output windings W1 and W2.

$$f = NP/60 \tag{2}$$

where the number of teeth of the inductor 4 is 2P and the number of revolution is N. The high frequency outputs are supplied to diode stacks DS1 and DS2 via series capacitors CS1 and CS2 and full-wave rectified in opposite polarities with each other. The waveforms of these rectified outputs are represented by FIGS. 5B and 5B'. Suppose the reference signal generating means OSC supplies the silicon controlled rectifiers SCR1 and SCR2 alternately with gate signal pulses with a phase difference of 180°, as shown in FIG. 5C and 5D, either of the silicon controlled rectifiers SCR1 and SCR2 is turned on when its own gate circuit is triggered, and turned off when the gate circuit of the other silicon controlled rectifier is triggered. The waveform of the current flowing to the silicon controlled rectifier SCR1 is represented by FIG. 5E and the waveform of the current flowing in the other silicon controlled rectifier SCR2 is represented by FIG. 5E'. As a result, a low frequency voltage having a waveform as shown in FIG. 5F which is formed by synthesizing the waveform of FIG. 5E and the waveform of FIG. 5E', is applied to the load L.

In the embodiment shown in FIGS. 3 and 4, the output voltages of the two output windings W1 and W2 are rectified by the diode stacks DS1 and DS2 in opposite polarities with each other, but it is needless to say that a low frequency voltage having a waveform shown in FIG. 5F can be applied to the load L by applying the output voltage of a single output winding in common to the diode stacks DS1 and DS2.

Figure 8:
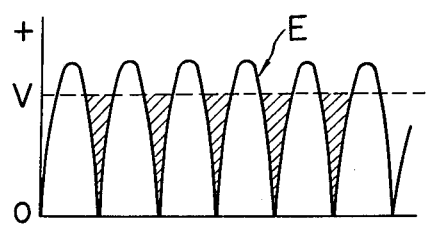
FIG. 8 is an illustration of operations of a conduction control means provided in accordance with this invention.

The above-mentioned silicon controlled rectifiers SCR1 and SCR2 have corresponding commutating circuits, and when one silicon controlled rectifier SCR2 is triggered while the other silicon controlled rectifier SCR1 is conducting, a voltage is induced in one winding L1 of the commutating transformer by the current flowing through the winding L2 of the commutating transformer to apply an inverse voltage to SCR1 to turn off it, and vice versa. Thus, precise conduction switchover of SCRs is accomplished. The high frequency component of the high frequency rectified output (FIG. 5B, Fig. 5B') connected to the load L is filtered by the filter capacitor Cf connected in parallel to the load L, and thus, a voltage shown by dotted lines in FIG. 5F is applied across the load L. In this invention, during the period when the high frequency rectified voltage (FIG. 5B, FIG. 5B') decreases through the voltage level V, V' in the figure, SCR1 and SCR2 are prevented from being turned off by mistake by short-circuiting the reverse voltage applied to SCR1 and SCR2 by diodes D1 and D2. For example, SCR1 is turned on, triggered by the gate signal (FIG. 5C), and the high frequency rectified voltage (FIG. 5B) is connected to the load L. FIG. 8 is an enlarged view of this state. Under this state, during the period when the high frequency rectified voltage becomes smaller than the filtered voltage V generated across the capacitor Cf (the shadowed portion in FIG. 8), the diode D1 is brought into coduction to prevent a reverse voltage from being applied to SCR1, whereby SCR1 is maintained in ON state until it is turned off by the gate signal D applied to SCR2. Thus, a load current of DC waveform containing no high frequency ripples flows in the load L corresponding with the filtered voltage across the capacitor Cf, with the result that a low frequency rectangular waveform output of, say 50 Hz is obtained. In this invention, an exciter coil EW2 is wound on the stator 5 of the high frequency generator 3, and a voltage induced in EW2 is supplied to the field coil FW through the output voltage stabilizing means 6 to form the major magnetic field of the generator. Output variations produced across the load L are fed back to the output voltage stabilizing means 6 so as to maintain the output voltage of the generator at a constant level by controlling the current fed to the field coil FW in accordance with the output variation. Another exciter coil EW1 is provided facing the engine flywheel 2, and an electromotive force induced in EW1 is supplied to the field coil FW through the output voltage stabilizing means 6 to provide the initial excitation for starting the generator. An output produced by the exciter coil EW1 and rectified by the rectifying circuit 7 is used as a DC power supply for the reference signal generating means OSC after passing through a filter 8.

Figure 6A:
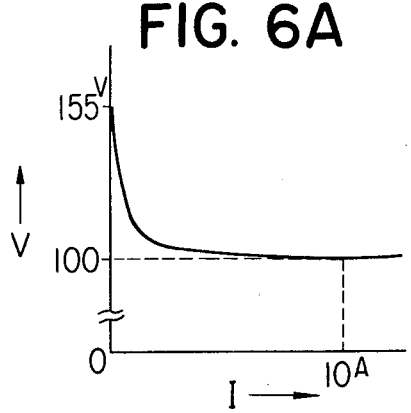
FIGS. 6 A and B are characteristics charts exhibiting how the external characteristics of an AC generator is improved by this invention.
Figure 6B:
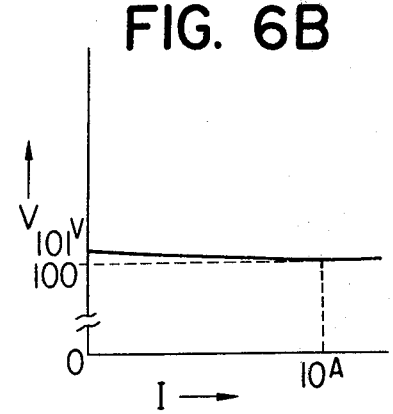

In an AC generating device described above, the external characteristics, i.e., the output voltage-load current characteristics when the output voltage stabilizing means 6 is not provided are characterized in that voltage variations under light load are so large that the voltage variation rate reaches as high as 55%, as shown in FIG. 6A. However, when the output voltage stabilizing means 6 is provided according to this invention, the external characteristics are remarkably improved and the voltage variation rate is reduced to about 1%, as shown in FIG. 6B. As disclosed in the embodiment in FIG. 4, the output voltage stabilizing means 6 according to this invention is provided in the transmission path of exciting energy to be fed to the field coil FW of the high frequency generator 3, which is produced in a specially provided exciter coil EW2, not directly produced in output windings W1 and W2 to prevent adverse effects of an unwanted closed circuit formed between the exciting energy source and the variation detecting portion of the output voltage stabilizing means 6. Furthermore, since the waveform of the exciting current fed to the field coil FW of the high frequency generator 3 affects the output waveform of output windings W1 and W2, any on-off type control circuit cannot be used as the output voltage stabilizing means 6. Therefore, an impedance variable type has to be used.

Figure 7:
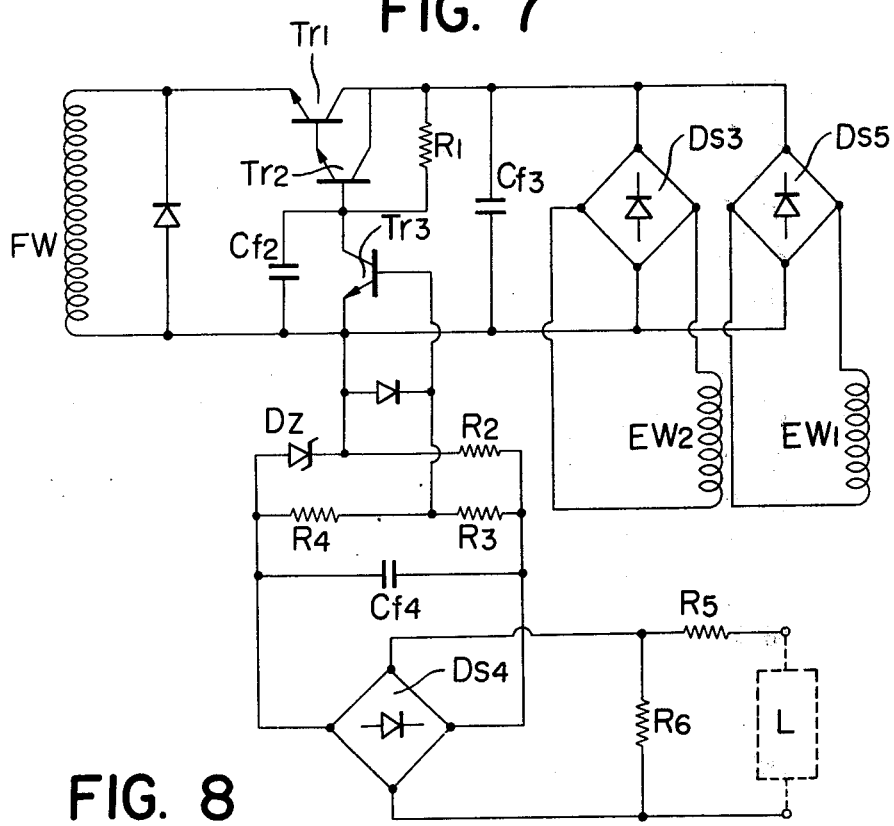
FIG. 7 shows the construction of an embodiment of an output voltage stabilization circuit provided in accordance with this invention.

FIG. 7 is a circuit diagram illustrating a favorable control circuit for the output voltage stabilizing means 6 in this invention. In the figure, FW, EW1, EW2 and L correspond with the field coil FW, the exciter coil EW1, the exciter coil EW2 and the load L of the high frequency generator 3 in FIG. 4. R5, R6 and DS4 are resistance dividers and a diode stack constituting a detection circuit for detecting the voltage across the load L. Resistors R2 R3 and R4 and zener diode Dz constitute a bridge circuit for establishing a zener voltage to operate the output voltage stabilizing means 6 at more than the predetermined level of the detected voltage. Tr1 and Tr2 are Darlington-connected transistors whose collector-emitter impedance is controlled, Tr3 is a control transistor for controlling transistors Tr1 and Tr2 in accordance with the detected voltage, Cf2 is a capaciter for determining the time constant for stabilization control, and Cf3 and Cf4 are smoothing capacitors of rectified output. DS3 and DS5 are diode stacks.

The operation of the output voltage stabilizing means 6 in FIG. 7 is as follows. When the voltage detected by resistors R5 and R6 for detecting load variations exceeds the zener voltage determined by the zener diode Dz, current flows in the base of the control transistor Tr3 to permit the transistor Tr3 to conduct. Accordingly, the base potential of the transistor Tr2 decreases, and the base current of the transistor Tr1 flowing from the resistor R1 through the transistor Tr2 also decreases, permitting the potential drop between the collector and the emitter of the transistor Tr1 to increase. Thus, the exciting current fed to the field coil FW decreases and accordingly the generated voltage also drops, allowing the voltage across the load L to be stabilized. The output voltage of the output windings W1 and W2 of the high frequency generator 3 is prevented from becoming unstable by setting the time constant of the capacitor Cf2 connected in parallel to the transistor Tr3 so that the response rate to the detected voltage becomes slow.

According to this invention, as described above, conduction control is accomplished by rectifying the output of the high frequency generator in both polarities and changing over the rectified output alternately at a desired frequency. Since the high frequency output of the generator is a continuous waveform of almost constant amplitude, it can be switched over in any phase and the control signal to the conduction control means can also be produced in any phase. Therefore, the reference signal generating means producing the control signal does not require any synchronization control means SYNC as shown in FIG. 2 for synchronization the control signal with the high frequency output of the generator. In addition, as the high frequency generator does not require to be of a special construction, the device can be made of a simple and inexpensive construction.

According to this invention, the provision of the output voltage stabilizing means makes it possible to produce a high power and stable low frequency output.

Furthermore, according to this invention, the gate signal fed to the conduction control means containing the silicon controlled rectifier in the reference signal generating means can be produced in pulse form, and losses due to high frequency in the silicon controlled rectifier and the commutating transformer windings can be reduced simply by connecting a capacitor across the output terminals.

What is claimed is:

1. An alternating current generating device comprising a high frequency generator having a single inductor which is rotated by an external drive unit, a field winding excited by a DC current, two output windings each providing a continuous wave high frequency output of substantially constant amplitude, rectifying means connected to each of said output windings for rectifying the high frequency output produced in the output windings, conduction control means connected to each of the rectifying means for switching over the output of the rectifying means time selectively alternately to connect to a load, reference signal generating means for applying low frequency control signals to the conduction control means independent of the phase of the high frequency output, said inductor being constructed so as to have a high plurality of teeth and said output windings being magnetically coupled to the inductor, an exciting winding magnetically coupled to the inductor, an output voltage stabilizing means coupled between the exciting winding and the field winding, the voltage stabilizing means responding to the output voltage of the load and providing a corresponding output current which supplies the field winding, said voltage stabilizing means comprising an impedance which varies in accordance with the output voltage of the load.

2. An alternating current generating device as set forth in claim 1 wherein the conduction control means comprises an SCR and a commutating circuit.

3. An alternating current generating device as set forth in claim 2 wherein a capacitor is connected in parallel to the load and the control signal has a pulse waveform and is applied to the gate of the SCR.

4. An alternating current generating device as set forth in claim 2 wherein said commutation circuit comprises a diode placed in opposition across each SCR, a capacitor in parallel across each diode, and a center tapped transformer interconnecting the two SCR's to thereby turn off one SCR when the other is triggered on.

5. An alternating current generating device as set forth in claim 1 further comprising a power supply circuit means, and wherein the output voltage stabilizing means is constructed so that its supply voltage is supplied by the power supply circuit means which is operative at the start.

6. An alternating current generating device as set forth in claim 1 wherein said output voltage stabilizing means comprises a bridge circuit for monitoring the output voltage of the load and providing an output at a voltage greater than a predetermined level, a control means receiving the bridge circuit output, a variable impedance means coupled to said control means to provide an impedance dependant upon said output voltage, and capacitor means coupled to said control means for determining the time constant for stabilization control.

* * * * *